US007071269B2

(12) United States Patent
Husemann et al.

(10) Patent No.: US 7,071,269 B2
(45) Date of Patent: Jul. 4, 2006

(54) ACRYLIC PSAS WITH NARROW MOLECULAR WEIGHT DISTRIBUTION

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 197 days.

(21) Appl. No.: 10/197,684

(22) Filed: Jul. 16, 2002

(65) Prior Publication Data

US 2003/0092859 A1 May 15, 2003

(30) Foreign Application Priority Data

Oct. 5, 2001 (DE) ........................................ 101 49 083

(51) Int. Cl.
*C08F 4/00* (2006.01)

(52) U.S. Cl. .................... 526/204; 526/205; 526/318.4; 526/319; 526/328.5; 525/256; 524/560; 428/343

(58) Field of Classification Search ................. 526/204, 526/205, 318.4, 319, 328.5; 524/560; 428/343; 525/256, 299
See application file for complete search history.

(56) References Cited

U.S. PATENT DOCUMENTS 4,581,429 A 4/1986 Solomon et al. ............ 526/220
5,767,210 A 6/1998 Lecomte et al. ............ 526/166
5,789,487 A 8/1998 Matyjaszewski et al. ... 525/301
5,811,500 A 9/1998 Dubois et al. .............. 526/145
5,854,364 A 12/1998 Senninger et al. .......... 526/192
5,919,871 A 7/1999 Nicol et al. .............. 525/333.8
5,945,491 A 8/1999 Matyjaszewski et al. ... 526/111
6,166,155 A 12/2000 Koch et al. ................. 526/204
6,369,165 B1 * 4/2002 Raether et al. .......... 525/326.9
6,380,315 B1 4/2002 Fischer et al. .............. 525/256
2001/0053814 A1 12/2001 Yamamoto et al. ......... 524/560

FOREIGN PATENT DOCUMENTS

DE 199 49 352 A1 4/2000
EP 0 578 498 A2 7/1993
EP 0 735 052 A2 2/1996
EP 0 824 110 A1 2/1998
EP 0 826 698 A1 4/1998
EP 0 841 346 A1 5/1998
EP 0 850 957 A1 7/1998
GB 2 342 649 A 4/2000
WO WO 96/24620 8/1996
WO WO 98/01478 1/1998
WO WO 98/11143 3/1998
WO WO 98/13392 4/1998
WO WO 98/30601 7/1998
WO WO 98/44008 10/1998
WO WO 99/31144 6/1999

OTHER PUBLICATIONS

"Self–regulation" of controlled radical polymerization, M. Steenbock, M. Klapper and K. Müllen, Max–Planck–Institut für Polymerforschung, Ackermannweg 10, D–55128 Mainz, FRG, Acta Polym. 1998, 49, S. 376–378.

Triazolinyl radicals–new additives for controlled radical polymerization, M. Steenbock, M. Klapper and K. Müllen, Max–Planck–Institut für Polymerforschung, Ackermannweg 10, D–55128 Mainz, Germany, Chem. Phys. 199, 763–769, (1998).

"Triazolinyl Radicals—New Additives For Controlled Radical Polymerization," Macromol. Chem. Phys. 199, 763–769 (1998), Max–Planck–Institut für Polymerforschung, Ackermannweg, 10, D–55128 Mainz, Germany.

"Triazolinyl–controlled Radical Polymerization As Innovative Route to Poly(hdroxyethyl Methacrylate)," Polymer Bulletin 46, 131–138, 2001, Max–Planck Institute for Polymer Research, Ackermannweg 10, D–55128 Mainz, Germany.

* cited by examiner

*Primary Examiner*—Tatyana Zalukaeva
(74) *Attorney, Agent, or Firm*—Norris McLauglin & Marcus PA

(57) ABSTRACT

A process for preparing acrylic pressure sensitive adhesives by means of radical polymerization of a monomer mixture to give a polyacrylate, wherein said polymerization is carried out with an initiator system comprising at least one triazolinyl compound of the general formula (I)

R′, N—N, R″, R‴, R, N

12 Claims, No Drawings

ACRYLIC PSAS WITH NARROW MOLECULAR WEIGHT DISTRIBUTION

The invention relates to a process for preparing acrylic pressure sensitive adhesives (PSAs) with narrow molecular weight distribution by means of radical polymerization.

BACKGROUND OF THE INVENTION

For industrial PSA tape applications it is very common to use polyacrylate PSAs. Polyacrylates possess a variety of advantages over other elastomers. They are highly stable toward UV light, oxygen, and ozone. Synthetic and natural rubber adhesives normally contain double bonds, which make these adhesives unstable to the aforementioned environmental effects. Another advantage of polyacrylates is their transparency and their serviceability within a relatively wide temperature range.

Polyacrylate PSAs are generally prepared in solution by free radical polymerization. The polyacrylates are generally applied to the corresponding backing material from solution using a coating bar, and then dried. In order to increase the cohesion, the polymer is crosslinked. Curing takes place thermally or by UV crosslinking or by EB curing (EB: electron beams). The process described is relatively costly and ecologically objectionable, since as a general rule the solvent is not recycled and the high consumption of organic solvents represents a high environmental burden.

Moreover, it is very difficult to produce PSA tapes with a high adhesive application rate without bubbles.

One remedy to these disadvantages is the hotmelt process. In this process, the PSA is applied to the backing material from the melt.

However, this new technology has its limitations. Prior to coating, the solvent is removed from the PSA in a drying extruder. The drying process is associated with a relatively high temperature and shearing effect, so that high molecular mass polyacrylate PSAs in particular are severely damaged. The acrylic PSA gels, or the lower molecular mass fraction is greatly enriched as a result of molecular weight breakdown. Both effects are undesirable, since they are disadvantageous for the application. Either the adhesive can no longer be applied, or there are changes in its technical adhesive properties, since, for example, when a shearing force acts on the adhesive the lower molecular mass fractions act as lubricants and so lead to premature failure of the adhesive.

One solution to mitigating these disadvantages is offered by polyacrylate adhesives with a low average molecular weight and narrow molecular weight distribution. In this case the fraction of low molecular mass and high molecular mass molecules in the polymer is greatly reduced by the polymerization process. The reduction in the high molecular mass fractions reduces the flow viscosity, and the adhesive shows less of a tendency to gel. As a result of the reduction in the low molecular mass fraction, the number of oligomers which reduce the shear strength of the PSA is lessened.

A variety of polymerization methods are suitable for preparing low molecular mass PSAs. The state of the art is to use regulators, such as alcohols or thiols, for example (Makromolekule, Hans-Georg Elias, 5th Edition, 1990, H üthig & Wepf Verlag, Basel). These regulators reduce the molecular weight but broaden the molecular weight distribution.

Another controlled polymerization method used is atom transfer radical polymerization (ATRP), in which initiators used preferably include monofunctional or difunctional secondary or tertiary halides and, for abstracting the halide(s), complexes of Cu, Ni, Fe, Pd, Pt, Ru, Os, Rh, Co, Ir, Cu, Ag or Au [EP 0 824 111 A1; EP 0 826 698 A1; EP 0 824 110 A1; EP 0 841 346 A1; EP 0 850 957 A1]. The various possibilities of ATRP are further described in U.S. Pat. Nos. 5,945,491, 5,854,364 and 5,789,487. Generally, metal catalysts are used, which have the side effects of adversely influencing the aging of the PSAs (gelling, transesterification). Moreover, the majority of metal catalysts are toxic, discolor the adhesive, and can be removed from the polymer only by complicated precipitations. A further variant is the RAFT process (reversible addition-fragmentation chain transfer). The process is described at length in WO 98/01478 A1 and WO 99/31144 A1, but in the manner set out therein is unsuited to the preparation of PSAs, since the conversions achieved are very low and the average molecular weight of the polymers prepared is too low for acrylic PSAs. Accordingly, the polymers described cannot be used as acrylic PSAs.

Improvements to the preparation process through the introduction of thioesters of trithiocarbonates are a subject of research. Nevertheless, acrylic PSAs comprising thioesters or trithiocarbonates generally have disadvantages for numerous fields of use. In the case of crosslinking with electron beams (necessary for acrylic hotmelts, applied at a high rate), irradiation is accompanied by the formation of sulfur fragments, which give rise to a very unpleasant odor. This must absolutely be avoided for PSA tapes.

U.S. Pat. No. 4,581,429 discloses a controlled radical polymerization process. As its initiator the process employs a compound of the formula R'R"N—O—X, in which X denotes a free radical species which is able to polymerize unsaturated monomers. In general, however, the reactions have low conversion rates. A particular problem is the polymerization of acrylates, which takes place only with very low yields and molecular weights.

WO 98/13392 A1 describes open-chain alkoxyamine compounds which have a symmetrical substitution pattern. EP 735 052 A1 discloses a process for preparing thermoplastic polymers having narrow polydispersities.

WO 96/24620 A1 describes a polymerization process in which very specific radical compounds, such as phosphorus-containing nitroxides, for example, are described.

WO 98/30601 A1 discloses specific nitroxyls, based on imidazolidine.

WO 98/4408 A1 discloses specific nitroxyls, based on morpholines, piperazinones and piperazinediones.

DE 199 49 352 A1 discloses heterocyclic alkoxyamines as regulators in controlled radical polymerizations.

Corresponding further developments of the alkoxyamines or of the corresponding free nitroxides improved the efficiency for the preparation of polyacrylates [Hawker, C. J., paper, National Meeting of the American Chemical Society in San Francisco, Spring 1997; Husemann, M., IUPAC World-Polymer Meeting 1998, Gold Coast, Australia, paper on "Novel Approaches to Polymeric Brushes using 'Living' Free Radical Polymerizations" (July 1998)]

In the abovementioned patents and papers attempts were made to improve the control of radical polymerization reactions. There nevertheless exists a need for a nitroxide-controlled polymerization process which is highly reactive and can be used to realize high conversions in combination with high molecular weight and low polydispersity.

Experiments relating to such techniques require highly inert conditions; moreover, only purified and distilled monomers can be used. At the present time, this process is difficult to scale up to an economic industrial process.

U.S. Pat. No. 6,166,155 and WO 98/11143, in contrast, describe processes for polymerizing vinyl compounds which provide polymers with polydispersities of less than 2. Here, electron donor compounds and triazolyl radicals, respectively, are used as control reagents for the polymerization. Acrylic PSAs are not described therein. Moreover, some of the compounds described therein contain sulfur or selenium, which again, in the case of electron beams for crosslinking these acrylic PSAs, would lead to fragmentation. Furthermore, acrylic PSA tapes are subject to very strict regulations, and so PSA tapes containing selenium can be ruled out per se.

Additionally, polydispersities of less than 2 are very difficult to achieve for acrylic PSAs, since the polymerizations generally have to be carried out up to a high conversion (>98%). In order to bring this about within a relatively short time, it is necessary to add two or more initiators, which accelerate the reaction and thus impair the effect of the control reagent. A polydispersity range from 2 to 3.5 is therefore regarded as ideal.

It is an object of the invention, therefore, to provide an initiator system for a corresponding polymerization process, and to offer a polymerization process, which does not have the disadvantages of the aforementioned prior art, or at least not to so great an extent.

SUMMARY OF THE INVENTION

Surprisingly it has been found that triazolinyl compounds, as control reagents of type (I), in conjunction with slow-thermal-decomposition azo or peroxo initiators, allow polymerization for the preparation of acrylic PSAs very effectively and rapidly at relatively high temperatures.

The invention accordingly provides a process for preparing acrylic pressure sensitive adhesives by means of radical polymerization of a monomer mixture to give a polyacrylate, the initiator system used comprising at least one triazolinyl compound of the general formula (I)

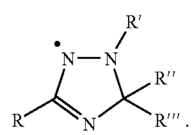

where R, R', R'', R''' are chosen independently of one another or are identical and are

- branched and unbranched $C_1$ to $C_{18}$ alkyl radicals; $C_3$ to $C_{18}$ alkenyl radicals; $C_3$ to $C_{18}$ alkynyl radical
- $C_1$ to $C_{18}$ alkoxy radicals
- $C_1$ to $C_{18}$ alkyl radicals substituted by at least one OH group or a halogen atom or a silyl ether, $C_3$ to $C_{18}$ alkenyl radicals; $C_3$ to $C_{18}$ alkynyl radicals
- $C_2$–$C_{18}$ hetero alkyl radicals having at least one oxygen atom and/or an $NR^{IV}$ group in the carbon chain, it being possible for $R^{IV}$ to be any organic radical, and in particular being branched and unbranched $C_1$ to $C_{18}$ alkyl radicals; $C_3$ to $C_{18}$ alkenyl radicals: $C_3$ to $C_{18}$ alkynyl radicals
- $C_3$–$C_{18}$ alkenyl radicals, $C_3$–$C_{18}$ alkynyl radicals, $C_1$–$C_{18}$ alkyl radicals substituted by at least one ester group, amine group, carbonate group, cyano group, isocyano group and/or epoxide group and/or by sulfur
- $C_3$–$C_{12}$ cycloalkyl radicals
- $C_6$–$C_{10}$ aryl radicals
- hydrogen.

DETAILED DESCRIPTION

Control reagents (triazolinyl compounds in the sense of the initiator system set out above) of type (I) consist, in a more preferred version, of the following, further-restricted compounds:

Halogens are preferably F, Cl, Br or I, more preferably Cl and Br. As alkyl, alkenyl and alkynyl radicals in their various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl radicals.

Examples of alkenyl radicals having from 3 to 18 carbon atoms are propenyl, 2-butenyl, 3-butenyl, isobutenyl, n-2,4-pentadienyl-, 3-methyl-2-butenyl, n-2-octenyl, n-2-dodecenyl, isododecenyl and oleyl radicals.

Examples of alkynyl radicals having from 3 to 18 carbon atoms are propynyl, 2-butynyl, 3-butynyl-, n-2-octynyl and n-2-octadecynyl radicals.

Examples of hydroxyl-substituted alkyl radicals are hydroxypropyl, hydroxybutyl or hydroxyhexyl radicals.

Examples of halogen-substituted alkyl radicals are dichlorobutyl, monobromobutyl or trichlorohexyl radicals.

An example of a suitable $C_2$–$C_{18}$ hetero alkyl radical having at least one oxygen atom in the carbon chain is $—CH_2—CH_2—O—CH_2—CH_3$.

Examples of $C_3$–$C_{12}$ cycloalkyl radicals include cyclopropyl, cyclopentyl, cyclohexyl or trimethylcyclohexyl radicals.

Examples of $C_6$–$C_{10}$ aryl radicals include phenyl, naphthyl, benzyl radicals, or further substituted phenyl radicals, such as ethylbenzene, propylbenzene, p-tert-butylbenzyl etc., toluene, xylene, mesitylene, isopropylbenzene, dichlorobenzene or bromotoluene.

The above listings serve only as examples of the respective groups of compounds, and make no claim of completeness.

In one particularly advantageous procedure the triazolinyl compounds are chosen such that $R^{II}$ and $R^{III}$ are joined together with one another in the form of a spiro compound.

Great preference is given to using compounds (Ia) and (Ib) as control reagents:

(Ia)

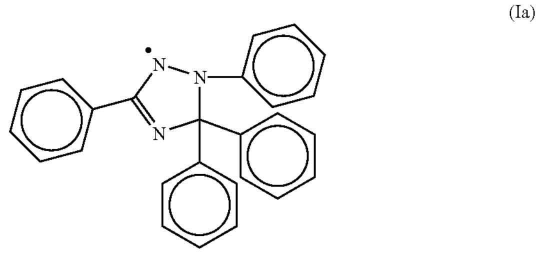

-continued (Ib)

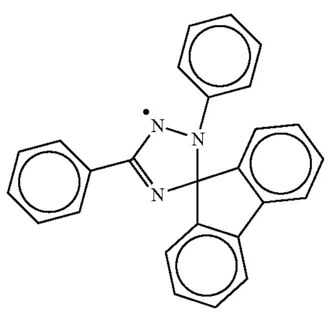

The inventive process is carried out with very great preference in such a way that the polyacrylates have a molecular weight distribution P of from 2 to 3.5. The polydispersity is determined by size exclusion chromatography (gel permeation chromatography, GPC).

The compounds of the initiator system are preferably in an amount of from 0.001 mol % to 10 mol %, more preferably in an amount of from 0.01 to 1 mol %, based on the monomer mixture.

In one very advantageous further development of the inventive process, further radical initiators for the polymerization are present in addition, especially thermal-decomposition initiators, particularly radical-forming azo or peroxo initiators. These are preferably added prior to or in the course of the polymerization, with the addition of the further initiators taking place in at least two process stages.

In principle, all customary initiators which are known for acrylates are suitable for this purpose. The production of C-centered radicals is described in Houben Weyl, Methoden der Organischen Chemie, Vol. E 19a, pp. 60–147. These methods are employed, preferentially, in analogy.

Examples of radical sources are peroxides, hydroperoxides, and azo compounds; some nonlimiting examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, benzpinacol. In one very preferred version, 1,1'-azobis (cyclohexanecarbonitrile) (Vazo 88™ from DuPont) is used as radical initiator.

Moreover, it is also possible to use radical sources which release radicals only under irradiation with UV light.

For initiating the polymerization, the input of heat is essential for the thermal-decomposition initiators. For the thermal-decomposition initiators, polymerization can be initiated by heating at from 50 to 160° C., depending on initiator type. For the use of UV initiators, irradiation is carried out using UV light of the appropriate wavelength. This reaction may be conducted within a temperature range from 0 to 150° C.

After the polymerization step is over the reaction mixture can be cooled to a temperature below 60° C., preferably to room temperature.

For the process for preparing the acrylic PSA it is preferred to use a monomer mixture composed to the extent of at least 70% by weight of ethylenically unsaturated compounds, especially (meth)acrylic acid and/or derivatives thereof. This monomer mixture is subjected to controlled radical polymerization using the initiator system described.

A preferred monomer mixture is composed of at least 70% by weight of acrylic monomers of the general formula

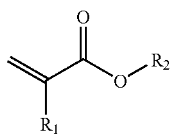

where $R_1$=H or $CH_3$ and $R_2$=H or is an alkyl chain having 1–20 carbon atoms.

In one advantageous embodiment of the inventive process vinyl compounds are used additionally as monomers, with a fraction of up to 30% by weight, in particular one or more vinyl compounds chosen from the following group:

vinyl esters, vinyl halides, vinylidene halides, nitriles of ethylenically unsaturated hydrocarbons.

Examples that may be mentioned here of such vinyl compounds include vinyl acetate, N-vinylformamide, vinylpyridine, acrylamides, acrylic acid, hydroxyethyl acrylate, hydroxyethyl methacrylate, ethyl vinyl ether, vinyl chloride, vinylidene chloride, acrylonitrile, maleic anhydride and styrene, without wishing to be unnecessarily restricted by this listing. It is also possible to use all other vinyl compounds which fall within the group specified above, and also all other vinyl compounds which do not fall within the classes of compounds specified above.

For the polymerization the monomers are chosen such that the resulting polymers can be used as industrially useful PSAs, especially in such a way that the resulting polymers possess pressure-sensitively adhesive properties in accordance with the "Handbook of Pressure Sensitive Adhesive Technology" by Donatas Satas (van Nostrand, New York 1989). For these applications, the static glass transition temperature of the resulting polymer is advantageously below 25° C.

The polymerization may be conducted in the presence of one or more organic solvents and/or in the presence of water. In one advantageous embodiment of the process there are additional cosolvents or surfactants present, such as glycols or ammonium salts of fatty acids.

Preferred processes use as little solvent as possible. Suitable organic solvents or mixtures of solvents are pure alkanes (hexane, heptane, octane, isooctane), aromatic hydrocarbons (benzene, toluene, xylene), esters (ethyl, propyl, butyl, or hexyl acetate), halogenated hydrocarbons (chlorobenzene), alkanols (methanol, ethanol, ethylene glycol, ethylene glycol monomethyl ether) and ethers (diethyl ether, dibutyl ether) or mixtures thereof. A water-miscible or hydrophilic cosolvent may be added to the aqueous polymerization reactions in order to ensure that the reaction mixture is present in the form of a homogenous phase during monomer conversion. Cosolvents which can be used in advantage with the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carbonic acids and salts thereof, esters, organic sulfides, sulfoxides, sulfones, alcohol derivatives, hydroxy ether derivates, amino alcohols, ketones and the like, and also their derivatives and mixtures.

In another procedure the polymerization may also be carried out in bulk. In this case the reaction regime and the reactor must be designed such that the heat of polymerization which develops during polymerization can be dissipated and the composition does not gel. It is also possible as well to add compounds which prevent the gelling of the pressure sensitive adhesive.

The polyacrylates prepared preferably have an average molecular weight (weight average) $M_w$ of 75 000 to 700 000 g/mol, more preferably between 100 000 and 450 000 g/mol. The average molecular weight $M_w$ is determined by size exclusion chromatography (gel permeation, chromatography, GPC) or matrix-assisted laser desorption/ionization mass spectrometry (MALDI-MS).

Depending on reaction regime, the acrylic PSAs prepared by this process have a polydispersity $P=M_w/M_n$ of from 2 to 3.5.

For the use of the polyacrylates prepared by the inventive process as pressure sensitive adhesives, the polyacrylates are optimized by optional blending with at least one resin. Tackifying resins to be added include without exception all existing tackifier resins described in the literature. Representations that may be mentioned include pinene resins, indene resins and rosins, their disproportionated, hydrogenated, polymerized, esterified derivatives and salts, the aliphatic and aromatic hydrocarbon resins, terpene resins and terpene-phenolic resins, and also C5, C9 and other hydrocarbon resins. Any desired combinations of these and other resins may be used in order to adjust the properties of the resulting adhesive in accordance with what is desired. In general it is possible to use all resins which are compatible (soluble) with the corresponding polyacrylates; reference may be made in particular to all aliphatic, aromatic, alkylaromatic hydrocarbon resins, hydrocarbon resins based on pure monomers, hydrogenated hydrocarbon resins, functional hydrocarbon resins, and natural resins. Explicit reference is made to the depiction of the state of the art in the "Handbook of Pressure Sensitive Adhesive Technology" by Donatas Satas (van Nostrand, 1989).

In a further advantageous development one or more plasticizers are added to the PSA, such as low molecular mass polyacrylates, phthalates, whale oil plasticizers or plasticizer resins, for example.

The acrylic PSAs may further be blended with one more additives such as aging inhibitors, light stabilizers, ozone protectants, fatty acids, resins, nucleators, blowing agents, compounding agents and/or accelerators.

They may further be admixed with one or more fillers such as fibers, carbon black, zinc oxide, titanium dioxide, solid or hollow glass (micro)beads, microbeads of other materials, silica, silicates and chalk, with the addition of blocking-free isocyanates being a further possibility.

Particularly for use as a pressure sensitive adhesive it is an advantage for the inventive process if the polyacrylate is applied preferably from the melt to a backing or to a backing material, as a film.

For this purpose the polyacrylates prepared as described above are advantageously concentrated to give a polyacrylate composition whose solvent content is ≦2% by weight. This process takes place preferably in a concentrating extruder. Then, in one advantageous variant of the process, the polyacrylate composition Is applied in the form of a film, as a hotmelt composition, to a backing or to a backing material.

It is also possible for the polyacrylates prepared in accordance with the invention to be processed in gel-free form in the hotmelt process at 140° C. for at least 8 hours. "Gel-free" means that the polymer does not form any polymer network in the course of concentration, in the concentrated extruder, for example, and does not form any gel up until the time it is conveyed to the coating unit either. This property is essential for acrylic hotmelt PSAs, since gelled adhesives when coated from the nozzle or by the roller would otherwise exhibit gel specks or smears. These must be avoided for a uniform and commercial product (PSA tape). In extreme cases, polyacrylate PSAs exhibiting such crosslinking can no longer be applied. This quality requirement is difficult to achieve particularly for polyacrylate PSAs with a narrow molecular weight distribution, since polymerization regulators incorporate into the polymer chain chemical compounds which may act as fracture sites for thermal decomposition and for decomposition under shear.

Backing materials used for the PSA, for adhesive tapes for example, are the materials customary and familiar to the skilled worker, such as films (polyesters, PET, PE, PP, BOPP, PVC), nonwovens, foams, wovens and woven films, and also release paper (glassine, HDPE, LDPE). This list is not conclusive.

For the PSA utility it is particularly advantageous to crosslink the polyacrylates following application to the backing or to the backing material. For this purpose, in order to produce the PSA tapes, the polymers described above are optionally blended with crosslinkers. Crosslinking may be brought about, advantageously, either thermally or by means of high-energy radiation; in the latter case, particularly by means of electron beams (EB) or, following the addition of suitable photoinitiators, by means of ultraviolet radiation.

Preferred substances crosslinking under radiation in accordance with the inventive process are difunctional or polyfunctional acrylates or difunctional or polyfunctional urethane acrylates, difunctional or polyfunctional isocyanates or difunctional or polyfunctional epoxides. Further, it is also possible here to use any other difunctional or polyfunctional compounds which are familiar to the skilled worker and are capable of crosslinking polyacrylates.

Suitable photoinitiators preferably include Norrish type I and type II cleavers, some possible examples of both classes being benzophenone, acetophenone, benzil, benzoin, hydroxyalkylphenone, phenyl cyclohexyl ketone, anthraquinone, thioxanthone, triazine, or fluorenone derivates, this list making no claim to completeness.

A further advantage of the inventive process is that the crosslinking of the above-described hotmelt PSAs proceeds without fragments which might lead to an odor nuisance.

The invention also pertains to the use of the polyacrylate prepared by the inventive process as a pressure sensitive adhesive.

Particularly advantageous is the use of the polyacrylate PSA prepared as described for an adhesive tape, in which case the polyacrylate pressure sensitive adhesive may have been applied to one or both sides of a backing.

EXAMPLES

Test Methods

The following test methods were used in order to evaluate both the adhesive properties and the general properties of the PSAs prepared.

180° Bond Strength Test (Test A)

A strip 20 mm wide of an acrylic PSA applied to a polyester layer was applied in turn to steel plates. The PSA strip was pressed down twice onto the substrate using a 2 kg weight. The adhesive tape was then immediately removed from the substrate at an angle of 180° C. and a speed of 300 mm/min. The steel plates were washed twice with acetone and once with isopropanol. The results are reported in N/cm and are averaged from three measurements. All measurements were carried out at room temperature.

Shear Strength (Test B)

A 13 mm wide strip of the adhesive tape was applied to a smooth steel surface which had been cleaned three times with acetone and once with isopropanol. The area of application measured 20 mm*13 mm (length*width). The adhesive tape was then pressed onto the steel backing four times using an applied pressure of 2 kg. At room temperature, a 1 kg weight was fastened to the adhesive tape. The shear stability times measured are reported in minutes and correspond to the average of three measurements.

Gel Permeation Chromatography GPC (Test C)

The average molecular weight $M_w$ and the polydispersity PD were determined by the company Polymer Standards Service, Mainz (DE). The eluent used was THF containing 0.1% by volume trifluoroacetic acid. Measurement was carried out at 25° C. The precolumn used was PSS-SDV, 5μ, $10^3$ Å, ID 8.0 mm×50 mm. Separation was carried out using the columns PSS-SDV, 5μ, $10^3$ and also $10^5$ and $10^6$ each with ID 8.0 mm×300 mm. The sample concentration was 4 g/l, the flow rate 1.0 ml per minute. Measurement was carried out against PMMA standards.

Determination of the Gel Fraction (Test D)

The carefully dried, solvent-free adhesive samples are welded into a pouch of polyethylene nonwoven (Tyvek nonwoven). From the difference in the sample weights before and after extraction with toluene the gel index is determined, i.e., the weight fraction of polymer that is not soluble in toluene.

Determination of the Conversion (Test E)

The conversion is determined gravimetrically and is reported as a percentage in relation to the amount by weight of the monomers used. The polymer is isolated by precipitation from methanol cooled to −78° C., filtered off and then dried in a vacuum cabinet. The polymer is weighed and its weight is divided by the initial weight of the monomers used. The calculated figure corresponds to the percentage conversion.

Procedures

Implementation of the Hotmelt Process in a Recording Extruder:

The shearing and thermal loading of the acrylic hotmelts was carried out using the Rheomix 610p recording extruder from Haake. The drive unit available was the Rheocord RC 300p instrument. The instrument was controlled using the PolyLab System software. The extruder was charged in each case with 52 g of pure acrylic PSA (~80% fill level). The experiments were conducted at a kneading temperature of 140° C., a rotary speed of 60 rpm and a kneading time of 8 hours. Thereafter the samples, where possible, were dissolved again and the gel fraction was determined in accordance with test D.

Preparation of the triazolinyls 1a (1,3,5,5-tetraphenyl-$\Delta^3$-1,2,4-triazolin-2-yl) and 1b (1',3'-diphenylspiro[9H-fluoren-9,5'-[$\Delta^3$-1,2,4-triazoline]-2-yl])

The preparation of the substances is described in Macromolecules 1998, Vol. 31, No. 16, pp. 5223–5228 or in Angewandte Chemie, 1989, 101, pp. 486–488 or Tetrahedron 1995, 51, 12883–12898. It was carried out in accordance with the corresponding experimental procedures.

General Implementation of the Polymerizations (Method 1)

A mixture of triazolinyl 1a or 1b (0.15 mol % based on the monomers) and 0.1 mol % Vazo 67™ (based on the monomers) is mixed with the monomers (85% strength solution in ethyl acetate) and the mixture is degassed a number of times and then heated at 80° C. under an argon atmosphere. After 6 hours, a further 0.1 mol % of Vazo 67™ (based on the monomers) is added. After 24 hours, the polymerization is terminated and the product is cooled to room temperature. Determination of molecular weight and polydispersity was carried out by GPC (test C) and the conversion was determined in accordance with test E.

Production of the Reference Specimens

Example 1

A 2 l glass reactor conventional for radical polymerizations was charged with 28 g of acrylic acid, 292 g of 2-ethylhexyl acrylate, 40 g of methyl acrylate and 300 g of acetone/isopropanol (93:7). Nitrogen gas was passed through the reaction with stirring for 45 minutes, after which the reactor was heated to 58° C. and 0.2 g of azoisobutyronitrile (AIBN, Vazo 64™, DuPont) was added. Then the external heating bath was heated to 75° C. and the reaction was carried out constantly at this external temperature. After a reaction time of 1 hour a further 0.2 g of AIBN was added. After 3 hours and 6 hours, in each case 150 g of acetone/isopropanol (93:7) mixture were added for dilution. In order to reduce the remaining initiators, in each case 0.4 g of bis(4-tert-butylcyclohexanyl) peroxydicarbonate (Perkadox 16™, Akzo Nobel) was added after 8 hours and after 10 hours. After a period of 22 hours the reaction was terminated and the product cooled to room temperature.

The average molecular weight and the polydispersity were determined by means of test C.

In order to investigate the thermal aging, the adhesive was freed from the solvent in a vacuum drying cabinet and then subjected to shearing and thermal loading in the recording extruder in accordance with the method described above.

In order to examine the technical adhesive products, the dry polyacrylate was applied to a 23 μm PET backing provided with Saran primer, application of the polyacrylates taking place at a rate of 50 g/$m^2$ using a laboratory roll coater, and the applied polyacrylate was then irradiated with 40 kGy at an acceleration voltage of 230 kV, using an EB unit from Crosslinking, and cured. For technical adhesive assessment, test methods A and B were conducted.

Example 2

The procedure of example 1 was repeated. The polymerization was carried out using 28 g of acrylic acid, 20 g of methyl acrylate, 20 g of styrene and 332 g of 2-ethylhexyl acrylate. The initial monomer concentration was raised to 80%.

Triazolinyl-Controlled Polymerizations

Example 3

28 g of acrylic acid, 292 g of 2-ethylhexyl acrylate and 40 g of methyl acrylate were used. Method 1 was repeated, using 1,3,5,5-tetraphenyl-$\Delta^3$-1,2,4-triazolin-2-yl as regulator. Working up and further processing were as an in example 1.

Example 3'

28 g of acrylic acid, 292 g of 2-ethylhexyl acrylate and 40 g of methyl acrylate were used. Method 1 was repeated, using 1',3'-diphenylspiro[9H-fluoren-9,5'-[$\Delta^3$-1,2,4-triazoline]-2-yl-] as regulator. Working up and further processing were as in example 1.

Example 4

28 g of acrylic acid, 20 g of methyl acrylate, 20 g of styrene and 332 g of 2-ethylhexyl acrylate were used. Method 1 was repeated, using 1,3,5,5-tetraphenyl-$\Delta^3$-1,2,4-triazolin-2-yl as regulator. Working up and further processing were as in example 1.

Example 4'

28 g of acrylic acid, 20 g of methyl acrylate, 20 g of styrene and 332 g of 2-ethylhexyl acrylate were used. Method 1 was repeated, using 1',3'-diphenylspiro[9H-fluoren-9,5'-[$\Delta^3$-1,2,4-triazoline]-2-yl] as regulator. Working up and further processing were as in example 1.

Example 5

40 g of acrylic acid and 360 g of 2-ethylhexyl acrylate were used. Method 1 was repeated, using 1',3'-diphenylspiro [9H-fluoren-9,5'-[$\Delta^3$-1,2,4-triazoline]-2-yl] as regulator. Working up and further processing were as in example 1.

Example 6

12 g of acrylic acid, 194 g of 2-ethylhexyl acrylate and 194 g of n-butyl acrylate were used. Method 1 was repeated, using 1',3'-diphenylspiro[9H-fluoren-9,5'-[$\Delta^3$-1,2,4-triazoline]-2-yl] as regulator. Working up and further processing were as in example 1.

Results

The comparison of examples 1 and 2 with 3 and 4 demonstrates the advantages of polyacrylate pressure sensitive adhesives prepared by triazolinyl-controlled polymerization. The reference specimens (examples 1 and 2) were prepared conventionally in a free radical polymerization. For comparison, the polyacrylates in examples 3 and 4, with the identical comonomer composition, were prepared by triazolinyl-controlled polymerization. The results of the polymerizations are illustrated in table 1:

TABLE 1

| Example | $M_w$ [g/mol] | Polydispersity PD |
|---|---|---|
| 1 | 489 500 | 5.9 |
| 2 | 532 000 | 6.3 |
| 3 | 355 000 | 3.0 |
| 4 | 378000 | 2.8 |

As a result of the free radical polymerization and the multiple initiation with the thermal-decomposition initiators, examples 1 and 2 exhibit a high polydispersity. Isopropanol as regulator reduces the average molecular weight but generally broadens the molecular weight distribution. As a result of the triazolinyl-controlled polymerization, significantly lower polydispersities are obtained. Moreover, there is a distinct improvement in the hotmelt processing properties. For this purpose the products of examples 1 to 4 were subjected to thermal loading and shearing in a hotmelt kneading apparatus at 140° C. for several hours. Thereafter the gel index was measured, in order to investigate the effect of the damage on the polymer. The results are illustrated in table 2:

TABLE 2

| Example | Gel index [%] |
|---|---|
| 1 | 11 |
| 2 | 8 |
| 3 | 0 |
| 4 | 0 |

Examples 1 and 2 show distinct aging after shearing load. The composition possesses a gel index of 8% (example 2) or 11% (example 1). Partially gelled polyacrylates cannot be applied either in the hotmelt process or from solution as PSAs. Consequently, aged PSAs of this kind are completely unsuitable for practical application. Contrastingly, examples 3 and 4 show no aging phenomena, such as gelling, for example. As a result of the triazolinyl-controlled polymerization, the polymers contain these compounds as end groups, which at high temperatures undergo decomposition to stable radicals again and are therefore able to act as radical scavengers in situ. As a result of the polymerization process, therefore, an aging inhibitor is incorporated directly into the PSA. The polyacrylates prepared by this group can be readily processed by the hotmelt process and, accordingly, can be used preferentially as PSAs.

In order to assess the technical adhesive properties the PSAs are crosslinked on the backing material. During EB crosslinking there were no odor-intensive substances which would indicate decomposition of the polymerization-controlling reagent in the polymer. Table 3 compares the technical adhesive data:

TABLE 3

| Example | SST (RT, 10 N) | BS-steel [N/cm] |
|---|---|---|
| 1 | 2475 | 3.8 |
| 2 | 3490 | 3.7 |
| 3 | +10 000 | 3.6 |
| 4 | +10 000 | 3.4 |

SST: Shear stability times
RT: Room temperature
BS: Bond strength

The narrower distribution of the molecular weights brings about a more efficient network in the case of EB crosslinking. The shear strength of the PSAs is raised. For an identical comonomer composition, examples 3 and 4 exhibit a much higher shear strength as compared with examples 1 and 2. As a result of the higher molecular weight, examples 1 and 2 are more amiable to EB crosslinking, so that the shear strength already decreases as a result of overcrosslinking. The more narrowly distributed examples, 3 and 4, require a higher radiation dose as a result of the lower average molecular and the narrower molecular weight distribution, with the consequence that these specimens are optimally crosslinked. The effect as far as the bond strengths are concerned is negligible.

In order to examine the efficiency of the preparation process of the invention, the conversion rate of examples 3, 3', 4 and 4' was measured. In all cases the conversions were 95% or more (see table 4).

TABLE 4

| Example | Conversion [%] |
|---|---|
| 3 | 95 |
| 3' | 95 |
| 4 | 95 |
| 4' | 96 |

The conversion measurements demonstrate that for controlled radical polymerization by a multiple addition of Vazo 67™ is possible to realize high conversions which are satisfactory for acrylic hotmelt PSAs.

In order to examine the process of the invention for producing acrylic PSA tapes, further acrylic PSAs with different comonomer compositions were prepared by means of triazolinyl-controlled polymerization. The results of the polyacrylates applied from the melt are illustrated in table 5.

TABLE 5

| Example | SST (RT, 10 N) | BS-steel [N/cm] |
|---|---|---|
| 5 | +10 000 | 4.1 |
| 6 | 5420 | 4.9 |

SST: Shear stability times
RT: Room temperature
BS: Bond strength

Examples 5 and 6 demonstrate that other comonomers as well can be used. Thus it is also possible to prepare relatively soft acrylic PSAs which possess a higher bond strength on steel, for example. The shear strength of the acrylic hotmelt PSA described is also very high.

The inventive process makes it possible to provide PSA tapes which are low in odor and therefore meet the quality requirements for use as PSA tapes. Sulfur compounds, which are often included as additives in prior art processes in order to achieve the desired properties of the PSA, were surprisingly replaceable by substances with a reduced odor, or even with no odor, as a result of the inventive process, without having to accept detractions in the required properties.

Moreover, as a result of the inventive process it was possible to prepare PSAs which can be dissolved or decomposed by the action of heat (pyrolyzable and/or evaporable systems). This makes the PSAs prepared in accordance with the invention particularly suitable for applications requiring PSAs which are to be removed again at a given time.

We claim:

1. A process for preparing acrylic pressure sensitive adhesives by means of radical polymerization of a monomer mixture to give a polyacrylate, wherein said polymerization is carried out with an initiator system comprising at least one triazolinyl compound of the general formula (I)

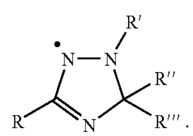

where R, R', R'', R''' are chosen independently of one another from the following group:

branched and unbranched $C_1$ to $C_{18}$ alkyl radicals; $C_3$ to $C_{18}$ alkenyl radicals; $C_3$ to $C_{18}$ alkynyl radicals $C_1$ to $C_{18}$ alkoxy radicals $C_1$ to $C_{18}$ alkyl radicals substituted by at least one OH group or a halogen atom or a silyl ether; $C_3$ to $C_{18}$ alkenyl radicals; $C_3$ to $C_{18}$ alkynyl radicals $C_2$–$C_{18}$ hetero alkyl radicals having at least one oxygen atom and/or an $NR^{IV}$ group in the carbon chain, it being possible for $R^{IV}$ to be any organic radical $C_3$–$C_{18}$ alkenyl radicals, $C_3$–$C_{18}$ alkynyl radicals, $C_1$–$C_{18}$ alkyl radicals substituted by at least one ester group, amine group, carbonate group, cyano group, isocyano group and/or epoxide group and/or by sulfur $C_3$–$C_{12}$ cycloalkyl radicals $C_6$–$C_{10}$ aryl radicals hydrogen provided that R'' and R''' cannot be hydrogen and that R'' and R''' are joined together with one another to form a spiro compound.

2. The process as claimed in claim 1, wherein said at least one triazolinyl compound is a triazolinyl compound of the following formula:

(Ib)

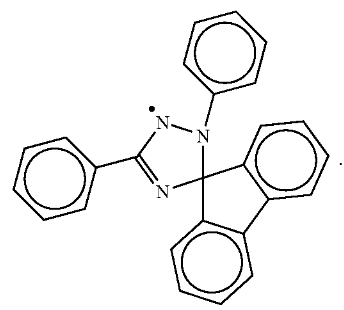

3. The process as claimed in claim 1, wherein said polyacrylate has a molecular weight distribution P of from 2 to 3.5.

4. The process as claimed in claim 3, wherein the compounds of the initiator system are present at from 0.001 mol % to 10 mol %, based on the monomer mixture.

5. The process as claimed in claim 1, wherein prior to or in the course of the polymerization further, radical-forming, thermal-decomposition initiator are added, the addition of the further initiators taking place in at least two stages.

6. The process as claimed in claim 1, wherein in the course of or following the polymerization resins or other additives, are added.

7. The process as claimed in claim 1, comprising the further step of applying the polyacrylate, in gel-free form from the melt, to a backing.

8. The process as claimed in claim 1, wherein the polyacrylate is crosslinked by exposure to high-energy radiation.

9. The process as claimed in claim 4, wherein the compounds of said initiator system are present in an amount of from 0.01 to 1 mol %.

10. The process as claimed in claim 5, wherein said further, radical-forming, thermal decomposition initiators are azo initiators, peroxo initiators or both.

11. The process of claim 6, wherein said resins or other additives are selected from the group consisting of aging inhibitors, light stabilizers, ozone protectants fatty acids, plasticizers, nucleators, blowing agents, accelerators, and fillers.

12. A single- or double-sided pressure sensitive adhesive tape comprising a pressure sensitive adhesive prepared in accordance with claim 1.

* * * * *

UNITED STATES PATENT AND TRADEMARK OFFICE

CERTIFICATE OF CORRECTION

PATENT NO. : 7,071,269 B2
APPLICATION NO. : 10/197684
DATED : July 4, 2006
INVENTOR(S) : Husemann et al.

It is certified that error appears in the above-identified patent and that said Letters Patent is hereby corrected as shown below:

Column 3, Line 56, "silyl ether, $C_3$" should read -- silyl ether; $C_3$ --

Column 7, Line 55, "composition Is applied" should read -- composition is applied --

Column 14, Line 2, "$C_8$-$C_{10}$ aryl radicals" should read -- $C_6$-$C_{10}$ aryl radicals --

Column 14, Line 34, "initiator are added" should read -- initiators are added --

Column 14, Line 52, "protectants fatty acids," should read -- protectants, fatty acids, --

Signed and Sealed this

Sixth Day of July, 2010

David J. Kappos
*Director of the United States Patent and Trademark Office*